United States Patent [19]

Reichenbach et al.

[11] 4,386,047
[45] May 31, 1983

[54] MOLDED ARTICLE KNOCK-OUT METHOD

[75] Inventors: Jerry D. Reichenbach, Carpentersville; Jamie R. Passarelli, Schaumburg, both of Ill.

[73] Assignee: CR Industries, Elgin, Ill.

[21] Appl. No.: 360,366

[22] Filed: Mar. 22, 1982

Related U.S. Application Data

[62] Division of Ser. No. 124,068, Feb. 25, 1980, Pat. No. 4,330,256.

[51] Int. Cl.³ ............................................... B28B 7/10
[52] U.S. Cl. .............................. 264/334; 264/328.8; 425/537
[58] Field of Search ............... 264/328.8, 318, 334; 249/68; 425/444, 129 R, 537, 422, 436 R, 554

[56] References Cited

U.S. PATENT DOCUMENTS

| | | | |
|---|---|---|---|
| 2,055,742 | 9/1936 | Burke | 425/444 |
| 3,718,415 | 2/1973 | De Felice | 264/334 |
| 3,798,299 | 3/1974 | Gumm et al. | 264/318 |
| 3,825,643 | 7/1974 | Hillier et al. | 264/334 |
| 3,893,644 | 7/1975 | Drazick | 425/444 |
| 3,914,086 | 10/1975 | Hujik | 249/68 |
| 3,950,119 | 4/1976 | Reichenbach | 425/129 R |
| 4,050,666 | 9/1977 | Tichelt | 249/68 |

FOREIGN PATENT DOCUMENTS 1437735 6/1976 United Kingdom ............... 425/444

*Primary Examiner*—Jay H. Woo
*Attorney, Agent, or Firm*—FitzGibbon, Roehrig, Greenawalt & Stone

[57] ABSTRACT

A knock-out method and apparatus for use in connection with the molding of articles, such as, for example, oil seals fabricated from elastomeric material bonded to a rigid casing, including a plurality of plunger members to apply successive sequential forces to selected sets of molded oil seals for removal thereof from frictional engagement within the molding machine and permit subsequent retrieval from the molding machine. The plurality of plunger members move upward into contact with oil seals retained in the molding center plate to apply sequential forces to the selected sets of the molded articles to position the seals for ready access on top of the plate.

7 Claims, 14 Drawing Figures

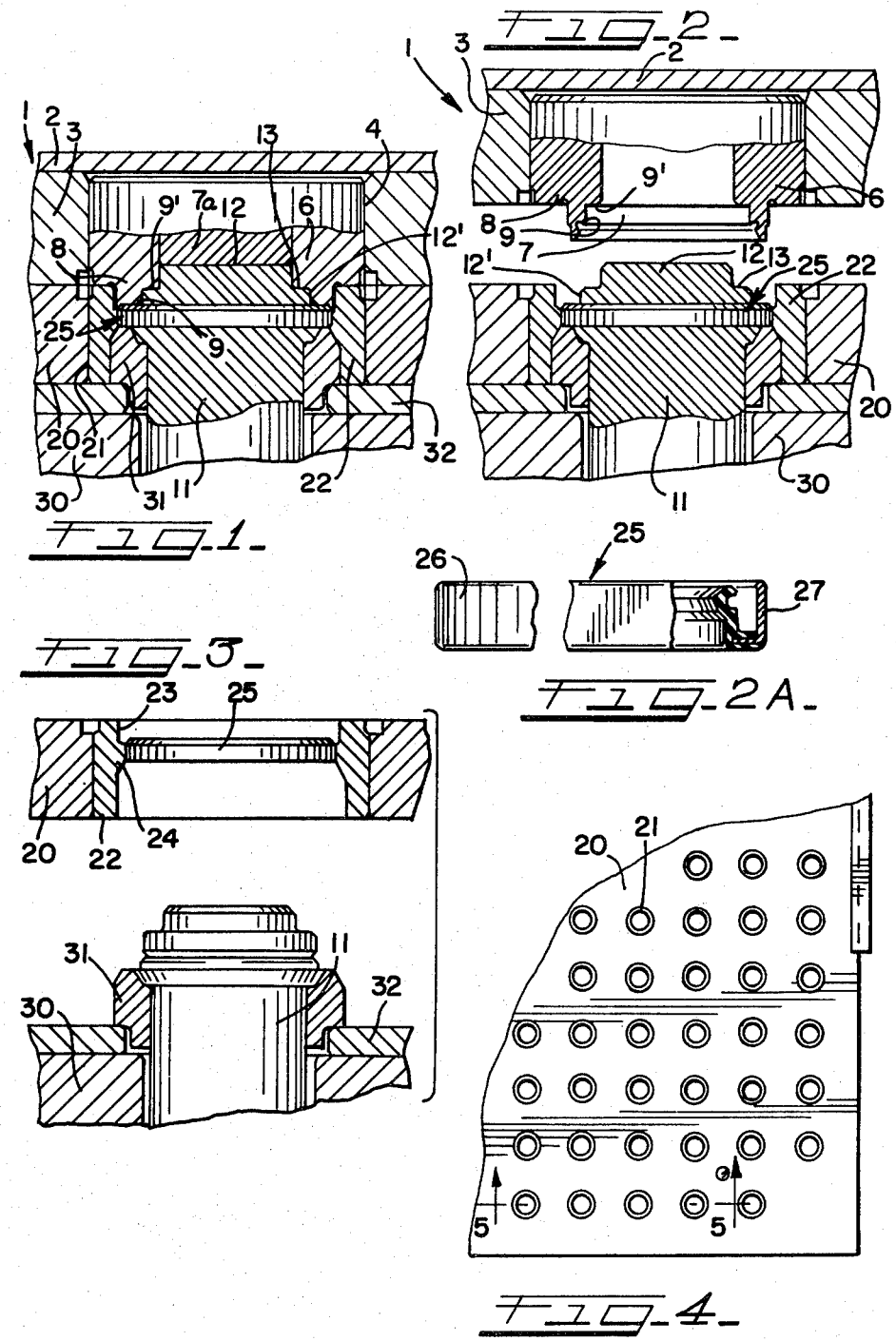

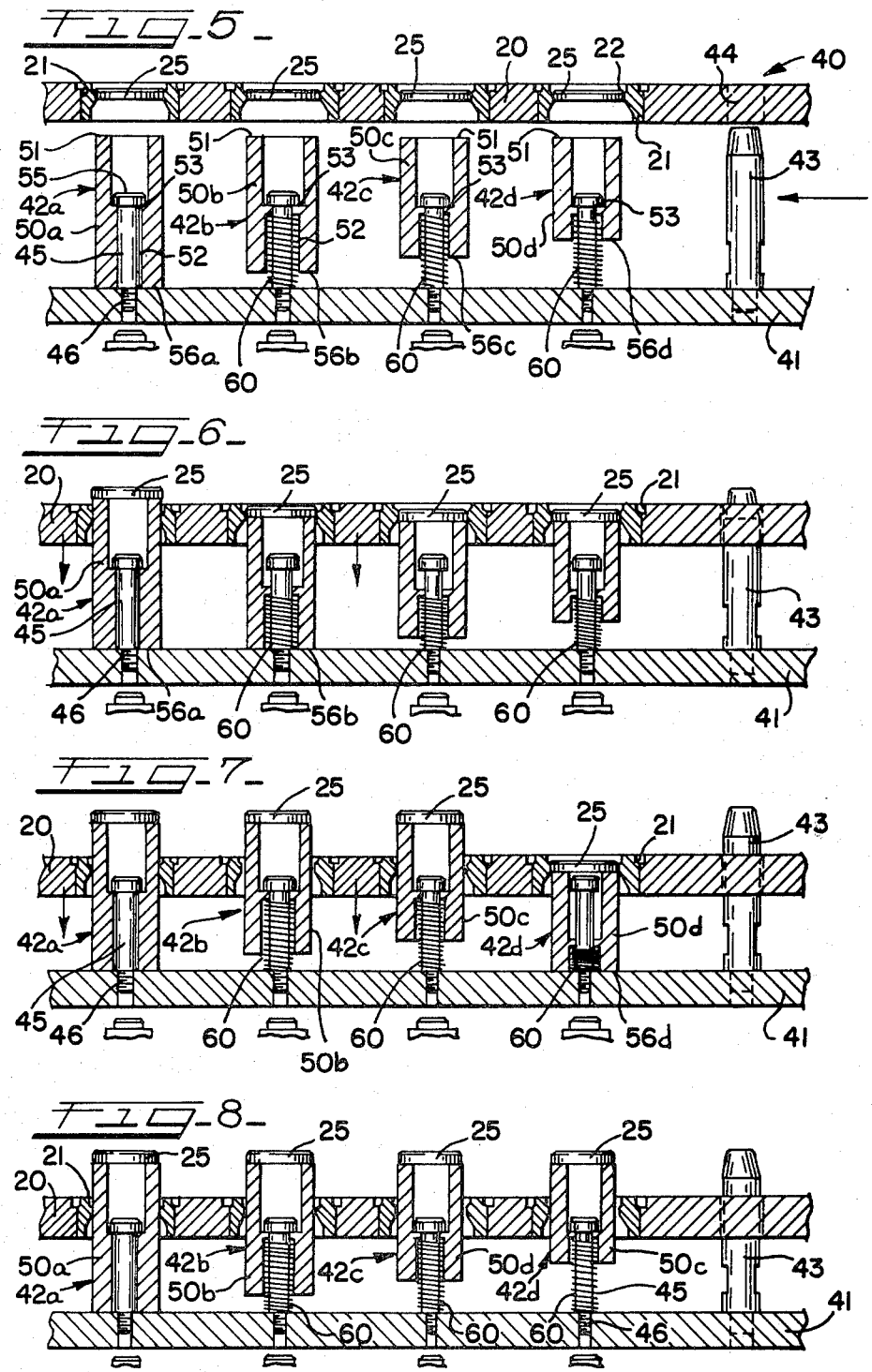

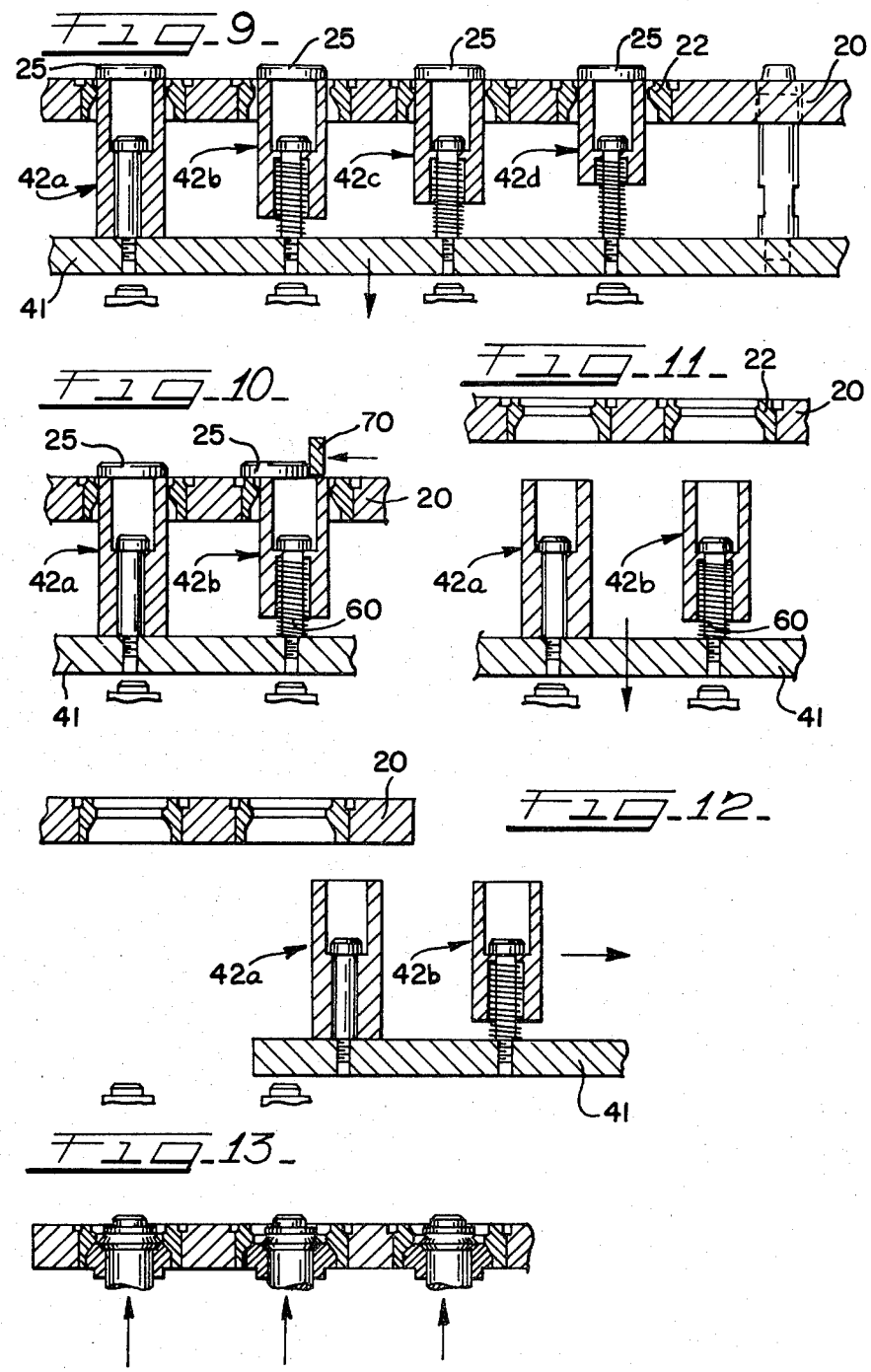

4,386,047

MOLDED ARTICLE KNOCK-OUT METHOD

This is a division of application Ser. No. 124,068, filed Feb. 25, 1980, now U.S. Pat. No. 4,330,256.

BACKGROUND OF THE INVENTION

This invention relates in general to a method and apparatus for manufacturing articles, and in particular, to the molding of materials.

More specifically, but without restriction to the particular use which is shown and described, this invention relates to a molded article knock-out method and apparatus to improve the equipment and process for manufacturing articles formed through molding.

Many articles are manufactured by molding them into a desired configuration from a fluent material. One type of molding is known in the art as compression molding by which a blank or "prep" is heated into a fluent state and is compressively caused to assume a predetermined configuration defined by a die cavity. An example of the employment of compression molding as a manufacturing technique exists in the oil seal industry. One common oil and grease seal manufactured by molding comprises a seal body having one or more sealing lips fabricated from a natural or synthetic elastomer, which is bonded to or otherwise cooperates with at least a part of a stiff casing or other structural member. The casing, stamping, or stiffener is utilized to provide rigid mounting of the seal, while the elastomeric seal body in use engages one or more members to provide fluid retention and the like.

It is common practice to manufacture such oil seal articles through the use of the compression molding method because of the relative economy and simplicity of the process. Compression molding permits large numbers of articles to be formed in multiple cavity molds subjected to a single heat cycle of the molding press. It is possible to produce 24, 36, 48 or other large number of parts during one heat cycle of operation of a multiple compressive molding machine. At the conclusion of the molding operation in such apparatus, the plurality of formed products are commonly retained in frictional engagement within components of the machine, such as, for example, cores, sleeves or apertures in one of the molding plates thereof. Such retained molded articles must then be dislodged and removed from frictional engagement for collection of the formed parts and subsequent use of the machine. It is obviously time consuming and highly inefficient to remove such molded articles on a one by one basis, either by hand or machine. Thus, a well known technique of removing molded articles from an immobile position within a plate relies upon simultaneous ejection of all the oil seals by means of a knock-out apparatus, which delivers the articles to an access position for retrieval from the machine.

Typically, such knock-out apparatus include a plurality of plunger-like members, which move into contact with the oil seals and supply a sudden simultaneous impact thereto to physically dislodge each of the articles. The sudden force generated by this simultaneous knock-out technique creates a large impact, which must be compensated for by the use of heavy duty parts in the molding machine. Under the influence of the application of a sudden force to eject the oil seals from the molding plate, the articles themselves are thus subjected to a sudden impact of short stroke, which also must be absorbed by the molding machine. The structure of the molding equipment must be constructed from parts having a suitable strength to resist the knock-out impact and with heavy duty hydraulic systems to apply the required force. The requirement for such stronger and higher output components significantly increases the cost of manufacturing and operating the molding equipment. In addition, the force required to knock-out the molded articles varies, due in part to normal tolerance differences, from seal to seal with the result that the more closely loosely fitting parts require less impact than others. The prior art technique of simultaneous removal fails to take advantage of the varying degrees of retention and applies a single force, regardless of what is required. Thus, the prior are method of knocking-out molded oil seals and the like by a sudden simultaneous jolt requires an elaborate system, which does not attain an optimum level of efficiency and economy.

SUMMARY OF THE INVENTION

It is an object of the present invention to improve the method and apparatus for molding articles.

Another object of the invention is to provide a more economical and efficient method and apparatus for molding articles.

Another object of the invention is to increase the efficiency at which molded articles are removed from a molding machine after a molding operation.

A further object of this invention is to minimize the force required to remove molded articles from the molding machine after a molding operation.

Still another object of this invention is to provide an improved molded article knock-out method and apparatus for removing molded articles from a molding plate of a molding machine.

A still further object of this invention is to provide a molded article knock-out apparatus and method to sequentially apply removal forces to a molded article after a molding operation.

Still another object of the invention is to provide a knock-out apparatus operatively to contact molded articles over an increased stroke of force application.

These and other objects are attained in accordance with the present invention wherein there is provided an improved knock-out method and apparatus for use in connection with the molding of articles, such as, for example, oil seals fabricated from an elastomeric material bonded to a rigid casing. The improved method and apparatus of the invention dislodges molded articles from a machine plate after a molding process through sequential application of forces to the formed members in an established pattern, such that a single simultaneous impact force is not employed to dislodge the articles as in the prior art.

The knock-out method and apparatus employs a plurality of plunger means, being arranged in operative relationship to a corresponding number of formed seals and the like, to dislodge and move the molded members to an access position for retrieval and collection subsequent to the molding process.

The knock-out method and apparatus herein disclosed applies successive knock-out forces to selected numbers or sets of the molded articles at selected positions of the knock-out means during its stroke of movement relative thereto. As a result, the knock-out method and apparatus of the invention attains a more efficient, economical and labor saving molding process through a reduction of the magnitude of the force required in the molded article knock-out step of operation. The sequential application of forces to selected numbers of articles reduces structural and motive requirements of the knock-out apparatus and minimizes the impact force occuring during operation of the molding machinery. The apparatus and the method of the invention thus insures that the molded articles and the parts of the molding machine are not subjected to unneeded and possible detrimentally high levels of force application.

DESCRIPTION OF THE DRAWINGS

Further objects of the invention, together with additional features contributing thereto and advantages accruing therefrom, will be apparent from the following description of a preferred embodiment of the invention, which is shown in accompanying drawings with like reference numerals indicating corresponding parts throughout, wherein:

FIG. 1 is a partial side sectional view of a molding machine in a molding mode of operation and employing the molded article knock-out method and apparatus of the present invention;

FIG. 2 is a partial sectional view of the molding apparatus of FIG. 1 during withdrawal of the core and lower plate from the upper plate after a molding operation;

FIG. 2A is a side schematic view, with parts in section, of an elastomeric seal member molded in the molding apparatus of FIG. 1;

FIG. 3 is a partial side sectional view of the molding apparatus of FIG. 1 after separation of the core from the molding plate subsequent to the operative movement of FIG. 2;

FIG. 4 is a partial top schematic illustration of the molding plate of the molding apparatus of FIG. 1;

FIG. 5 is a partial sectional view, taken along the lines 5—5 of FIG. 4, of the knock-out apparatus of the invention during lateral positioning beneath the compression molding plate to eject molded articles therefrom;

FIG. 6 is a partial sectional view of the knock-out apparatus of FIG. 5 during the initial sequence of vertical movement of the compression plate relative to the knock-out to eject selected ones of the molded articles from the compression molding plate;

FIG. 7 is a partial side sectional view of the knock-out apparatus of FIG. 5 in a subsequent sequence of operation from the positioning illustrated in FIG. 6 to eject additional molded articles;

FIG. 8 is a partial side sectional view of the knock-out apparatus of FIG. 5 in a subsequent sequence of operation illustrating the termination of the upward movement of the knock-out apparatus after ejection of all the molded articles;

FIG. 9 is a partial side sectional view of the downward movement of the knock-out apparatus of FIG. 5 to position the molded articles on the surface of the molding plate subsequent to the operative sequence illustrated in FIGS. 5–8;

FIG. 10 is a partial side sectional view of the removal of the molded articles from the molding plate after being positioned thereon by the knock-out apparatus as shown in FIG. 9;

FIG. 11 is a partial side sectional view of the separation of the knock-out apparatus from the compression molding plate following removal of the molded articles as illustrated in FIG. 10;

FIG. 12 is a partial sectional view of lateral withdrawal of the knock-out apparatus from beneath the compression molding plate subsequent to separation therefrom as illustrated in FIG. 11; and FIG. 13 is a partial side sectional view illustrating upward movement of the core and lower plate into operative position relative to the molding plate for commencement of a subsequent molding cycle.

DESCRIPTION OF THE PREFERRED EMBODIMENT

Referring now to FIGS. 1 to 13, there is illustrated a typical compression molding machine employing the molded article knock-out method and apparatus of the invention and undergoing a cycle of operation to compressive mold and retrieve articles. Although the invention of the application may be utilized in conjunction with the molding of a variety of articles and with molding equipment of numerous designs, one application of use is directed to the formation of a seal member from an elastomeric material for bonding to a rigid annular casing. A compressive molding process conventionally involves the application of pressure to a "prep" or blank of elastomeric material at an elevated temperature to mold an annular article into a desired cross-section and bond the article to the casing member. In the compressive molding machine having the components shown in FIGS. 1 to 13, the unmolded material in general undergoes compression at the required temperature to form the molded articles, after which process the molding units are withdrawn, and the molded articles are removed from the center plate by means of the article knock-out method and apparatus of the invention. It should be understood that the molding machine of FIGS. 1 to 13 include means to simultaneously mold a plurality of oil seals through the provision of a plurality of compressive molding die components of the type illustrated in FIG. 1.

Referring to FIG. 1, there is shown part of a compression molding machine in operative position during a molding process to form an oil seal or other molded annular article. As stated previously, the identical step of molding is performed in the machine at a plurality of stations to manufacture simultaneously a selected number of molded articles. Each of the molding stations for forming individual molded articles include substantially the identical components and function in the same manner as illustrated in FIG. 1. As shown in FIG. 1, the molding machine 1 includes an upper plate 2 having a die or insert molding member 3 in which a plurality of cavities 4 (one of which is shown in FIG. 1) are provided. The cavities 4 receive a respective upper insert or die member 6 having an annular cross section and forming a central opening 7 to retain a stationary member 7a. The annular face 8 of each of the upper inserts 6 is formed in a selected mold shape 9 by a plurality of angularly disposed surfaces to mold the article being formed into a desired configuration by creating a portion of the mold cavity (not shown). An inner axially facing surface 9' directly contacts the blank or "prep" material to apply pressure thereto to result in flow of the material downward into the mold cavity as will be apparent.

The die surfaces completing the mold cavity in cooperation with face 8 of the upper insert 6 are formed by a selected exterior configuration 10 provided on the upper end portion of a core of lower insert 11. The lower insert 11 is in the form of a cylindrical member having an enlarged end portion 12 to define a die cavity through a series of shoulders 12' of varying diameters and having beveled, rounded or sharp edges dependent on the form of the article to be molded. The die cavity (not shown) is formed by the upper and lower insert at the relative positions shown in FIG. 1. The end of the upper end portion 12 is adapted to be disposed in operative relationship with in opening 7 of the upper insert as a molding process is being made. Axially disposed surface 13 of the lower insert 11 also contacts the "prep" or blank to cause the flow of the material into position in the molding cavity.

As best shown in FIGS. 1 to 4, a center plate 20 is situated between the upper insert and the core and possesses a plurality of apertures 21 retaining an article receiving member 22. The member 22 is formed with a passage 23 having a continuous lip 24 to restrict the diameter of the passage. A rigid casing and the "prep" or blank of elastomeric material are placed in proper operative position between the inserts by suitable means (not shown) prior to commencement of a molding heat cycle. During molding, the elastomeric prep is situated between the axially disposed surface 9' of the upper die and the axially disposed surface 13 of the core 11 and the surrounding parts transfer heat thereto to transform the elastomeric material into a fluent state. The application of pressure between the core and die through relative vertical movement causes the elastomeric material to flow into the molding cavity (not shown) and assume the shape established thereby with resulting bonding to the rigid casing by any suitable technique. After a molding operation, a molded article 25 having a rigid casing 26, to which an elastomeric molded seal 27 of the form shown in FIG. 2A is bonded, is frictionally lodged on lip 24 in member 22 and must be removed therefrom by the knock-out method and apparatus of the invention as will be apparent from the following description.

The core 11 is mounted to a lower plate 30 for movement therewith in conjunction with annular collar 31 and plate member 32. As shown in FIG. 2, the upper plate 2 and the lower plate 32 vertically separate from each other, after the molding operation is concluded, by suitable hydraulic means (not shown). Upon separation of the upper and lower plates, the core 11 subsequently withdraws from the plate 20 as shown in FIG. 3 to expose the finished molded articles 25, in the form of casing 26 and elastomeric portion 27. An example of a pattern of apertures 21 and article receiving members 22 disposed in plate 20 is illustrated in FIG. 4.

Referring to FIGS. 5 to 12, there is illustrated the improved molded article knock-out method and apparatus of the invention for removing the molded articles from the center plate 20. The knock-out apparatus 40 is capable of lateral and vertical motion relative to the plate 20 by a suitable conventional hydraulic means, which need not be described for a clear understanding of the invention. As shown in FIG. 5, the knock-out apparatus moves initially in a lateral direction beneath the plate 20 after separation of the core and lower plate therefrom as shown in FIG. 3. After attaining vertical alignment with the respective apertures, the knock-out apparatus is caused to move upward to eject each of the molded articles from their retained position in center plate 20. The knock-out apparatus includes a plate 41 supporting a plurality of knock-out projections or plungers 42, comprising a selected number of sets of plungers 42a, 42b, 42c and 42d. The plurality of plungers 42 are situated in predetermined positions to directly correspond to the pattern of the apertures 21 of the plate 20 when in alignment therewith. Vertical alignment between the projections 42 and apertures 21 is maintained during upward movement by means of one or more guide pins 43 which engage corresponding openings 44 in plate 20. Each of the knock-out members 42 are supported by upright shafts 45 having a lower threaded end 46 secured within a bore 47 provided in the plate 41.

As shown in FIG. 5, there is illustrated one set of four of the plurality of projections 42 of the knock-out apparatus of the invention. Similar other sets of plungers are provided to correspond to the entire extent of apertures 21 formed in the plate 20 to remove all of the molded articles. The upright shafts 45 secure respective sleeve members 50a, 50b, 50c and 50d to plate 20 to form article engaging portions of the projections 42a, 42b, 42c and 42d. The sleeve members 50a, 50b, 50c and 50d are constructed of a length which progressively is smaller viewing the members from left to right of FIG. 5. Each of the sleeve members includes an annular upper face 51 adapted to contact the casing 26 of a molded oil seal 25 and eject it from core member 22.

As will be apparent, the faces 51 of the knock-out sleeve members 50a, 50b, 50c and 50d move to contact initially the molded articles at approximately the same time during upward movement of the knock-out apparatus. After article contact, a continued stroke of upward movement of the knock-out apparatus results in a sequential removal of the molded articles from plate 20. In the embodiment shown in FIG. 5, each of the sleeve members 50a, 50b, 50c and 50d include a lower bore 52 through which the upright shaft 45 extends. An upward axially disposed shoulder 53 is formed in sleeve 50a by an upper end bore 54 having a greater diameter than lower bore 52. An enlarged upper end 55 of the upright shaft 45 contacts the upper surface of shoulder 53 to secure the sleeves to plate 41. The bottom axial end face 56a of sleeve member 50a remains in contact with the plate 41 during its upward movement, such that upon contact with a molded article in member 22, a force is applied thereto and the oil seal is lifted to the position shown in FIG. 6. The other sleeve members 50b, 50c and 50d do not apply a knock-out force to the sleeve members during the sequence of operation shown in FIG. 6 as will be apparent.

The lower ends 56b, 56c and 56d of sleeves 50b, 50c and 50d are supported in spaced relationship to plate 41 by respective resilient spring members 60. The amount of spacing of the lower ends 56b, 56c and 56d to the plate 41 is progressively greater for each of the sleeves 50b, 50c and 50d, such that the plate 41 will contact the lower end of sleeves 50b, 50c and 50d on a sequential basis as the knock-out apparatus moves upward from initial contact with the molded articles. The variable spacing of lower ends 55b, 55c and 55d from plate 40 is provided by the progressively smaller dimension of the lower portion of the sleeves 50b, 50c and 50d measured from the shoulders 53 downward to the lower end. The dimension of the sleeves upward from the shoulder 53 to the upper face is equal on the other hand, achieving the approximate simultaneous initial engagement of the sleeve members with the molded articles. During removal of a molded article by sleeve member 50a to the position shown in FIG. 5, relative movement between the lower ends of sleeve members 50b, 50c and 50d and plate 41 occurs through compression of the springs 60, until the next longer sleeve member 50b is in direct contact with plate 41. During such relative movement, the force required to compress springs 60 is less than the force required to dislodge the oil seals to prevent movement of the sleeve members. Continued upward movement of the plate 41 then applies a knock-out force to another molded article through sleeve 50b as the plate contacts lower face 55b. After this molded article is ejected from aperture 22, the resilient force of spring 60 is sufficient to raise the molded article supported on sleeve 50b to the approximate same level as sleeve 50a illustrated in FIG. 7.

Subsequently, the operation is repeated by the further upward movement of plate 41 to engage the lower ends of sleeves 50c and 50d, resulting in all the molded articles being removed from apertures 21 to the positions shown in FIG. 8. During the removal of the oil seals to the position illustrated in FIG. 8, the knock-out apparatus applies four separate and successive knock-out forces to selected sets of the molded articles through a plurality of sleeve members in the form of sleeve members 50a, 50b, 50c and 50d, with the result that a single abrupt force of a relatively short stroke does not occur.

As shown in FIG. 9, the knock-out apparatus is lowered to a position whereby each of the articles, which were molded in the process illustrated in FIG. 1, are aligned substantially flush with the upper surface of the plate 20. In such a position, a retrieval means 70 of suitable design may be moved across the surface in a manner to move the molded articles from the apparatus for collection by a conventional technique. Upon the completion of the collection procedure as shown in FIG. 11, the knock-out apparatus vertically moves downward from its position within the apertures 21 to a position to be moved laterally away from the molding plate as shown in FIG. 12. In FIG. 13, there is illustrated the upward movement of the lower plate with the core 11 to commence another molding cycle.

In the foregoing description, there is disclosed the use of sets of four variable length, knock-out members through which the molded parts are removed from the locating surfaces of apertures 22 as the variable length sleeves 50b, 50c and 50d "bottom out", i.e., the lower ends 56 contact the upper surface of plate 41. It should be apparent to one skilled in the art, however, that one or more oil seals 25 may be more loosely retained in an aperture 22 than other oil seals, due to normal tolerance differences between article to article or aperture to aperture. In such situations, it is within the scope of the invention for sleeves 50b, 50c and 50d, after article contact, to release the more loosely fitting seals 25 from frictional retention in apertures 22, prior to actual direct contact between the bottom ends 56 of the sleeves and plate 41 during its upward stroke. Such removal will occur when the frictional force retaining the part is less than the upward force generated by the spring 60 during compression. It is also within the scope of the invention to use other selected numbers of sets of variable length sleeve members to contact sets of molded articles, other than the four lengths disclosed.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for removing a plurality of molded articles from a retained position in a member of a molding machine subsequent to a molding operation comprising the steps of
   positioning a force applying means in alignment with the plurality of molded articles retained in the member of the molding machine,
   moving said force applying means toward said plurality of molded articles for engagement therewith,
   continuing movement of said force applying means toward said plurality of molded articles for a force applying stroke to remove said plurality of molded articles, and
   applying successive forces to respective numbers of said plurality of molded articles at predetermined positions of said force applying means during said force applying to remove sequentially said plurality of molded articles.

2. The method of claim 1 wherein said step of applying successive forces is applied through a plurality of force applying members respectively engaging said plurality of molding articles.

3. The method of claim 1 further including the step of interrupting movement of said some of said plurality force applying members upon engagement with respective ones of said plurality of molded articles to delay the application of a removal force thereto.

4. The method of claim 3 further including the step of activating said some of the plurality of force applying members to apply a removal force to respective ones of said plurality of molded articles in at least one predetermined position of said force applying means during said force applying stroke subsequent to engagement of said molded aticles by said force applying means.

5. The method of claim 4 wherein a selected number of said some of said plurality of force applying members apply a removal force at a plurality of predetermined positions of said force applying means during said force applying stroke.

6. The method of claim 1 further comprising the step of applying a removal force to some of said plurality of molded articles at the position of engagement of said articles by said force applying means.

7. The method of claim 6 further comprising the step of applying a removal force to the remainder of said plurality of molded articles in at least one predetermined position of said force applying means subsequent to said position of engagement during said force applying stroke.

* * * * *